(12) United States Patent
Tanahashi et al.

(10) Patent No.: US 10,207,750 B2
(45) Date of Patent: Feb. 19, 2019

(54) VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 15/067,725

(22) Filed: Mar. 11, 2016

(65) Prior Publication Data

US 2016/0264192 A1 Sep. 15, 2016

(30) Foreign Application Priority Data

Mar. 13, 2015 (JP) .................................. 2015-050651

(51) Int. Cl.
*B62D 35/00* (2006.01)
*B62D 37/02* (2006.01)
*H05F 3/06* (2006.01)

(52) U.S. Cl.
CPC ............. *B62D 35/00* (2013.01); *B62D 37/02* (2013.01); *H05F 3/06* (2013.01)

(58) Field of Classification Search
CPC ............ B62D 35/00; B62D 37/02; H05F 3/06
See application file for complete search history.

(56) References Cited

U.S. PATENT DOCUMENTS

| 2003/0178467 A1* | 9/2003 | Lee ...................... B23K 1/0016 228/42 |
| 2004/0167679 A1 | 8/2004 | Sasaki et al. |
| 2006/0114636 A1* | 6/2006 | Fujiwara ................... B03C 3/36 361/230 |
| 2012/0152198 A1 | 6/2012 | Kim et al. |

FOREIGN PATENT DOCUMENTS

| CN | 103802758 A | 5/2014 |
| DE | 102008001103 A1 | 10/2009 |
| EP | 2458188 A1 | 5/2012 |
| JP | 2003-226134 A | 8/2003 |
| JP | 2006-088880 A | 4/2006 |
| JP | 2008-143476 A | 6/2008 |
| JP | 4664152 B2 | 4/2011 |
| JP | 2012210945 A | 11/2012 |
| TW | 201034876 A | 10/2010 |

* cited by examiner

*Primary Examiner* — Zeev V Kitov
(74) *Attorney, Agent, or Firm* — Hunton Andrews Kurth LLP

(57) ABSTRACT

A vehicle in which separation of airflow from a vehicle surface can be prevented without causing disfigurement is provided. A vehicle body is insulated from a road surface, and positive static charges accumulate on the vehicle body during propulsion. The vehicle comprises a charge control device adapted to decrease the positive potential of a separation point at which positively charged airflow flowing along a vehicle surface deviates from the vehicle surface during propulsion by applying negative ions to an inner surface of the separation point.

8 Claims, 4 Drawing Sheets

VEHICLE

The present invention claims the benefit of Japanese Patent Application No. 2015-050651 filed on Mar. 13, 2015 with the Japanese Patent Office, the disclosures of which are incorporated herein by reference in its entirety.

BACKGROUND

Field of the Invention

Embodiments of the present invention relate to the art of an automobile.

Discussion of the Related Art

JP-A-2008-143476 describes a vehicle provided with an air resistance reducing device adapted to produce negative ions by corona discharge. According to the teachings of JP-A-2008-143476, the air resistance reducing device is buried in a roof of the vehicle while being connected to the atmosphere through a longitudinal air hole. The air resistance reducing device comprises a first circuit and a second circuit, and the corona discharge occurs between a needle electrode and a plate electrode in each circuit. The first circuit is adapted to separate airflow from a surface of the vehicle by negatively ionizing air introduced from the rear side of the vehicle by the corona discharge, and by blowing the ionized air from the roof of the vehicle. By contrast, the second circuit is adapted to prevent airflow separation from the surface of the vehicle body by negatively ionizing air introduced from the roof by the corona discharge, and by blowing the ionized air from the rear side of the vehicle.

JP-A-2006-88880 describes a vehicle in which a silicon rubber sheet having an uneven surface is attached to a surface of a vehicle body to prevent airflow separation from the surface of the vehicle body.

JP-A-2003-226134 describes a negative ion generator for vehicles having a discharge needle adapted to negatively ionize air discharging from an air conditioner before entering into a vehicle interior.

However, in the vehicle taught by JP-A-2008-143476, a depression on the roof and the air hole on the rear side may create turbulence on the vehicle surface and hence airflow separation would be expedited. In addition, the vehicle surface may be disfigured by the air resistance reducing device and the air hole.

The silicon rubber sheet having an uneven surface taught by JP-A-2006-88880 may also cause disfigurement of a vehicle if attached to a vehicle surface. In addition, the silicon rubber sheet may be electrostatically charged easily during propulsion of the vehicle. Consequently, air may be separated from the sheet attached to the vehicle surface by repulsive force acting between the ionized air and static electricity on the sheet.

SUMMARY

Aspects of embodiments of the present invention have been conceived noting the foregoing technical problems, and it is therefore an object of embodiments of the present invention to provide a vehicle which can prevent separation of airflow from a vehicle surface without causing disfigurement of the vehicle.

During propulsion of the vehicle, positive static charges accumulate on a vehicle body insulated from a road surface. In order to achieve the above-explained objective, the vehicle according to embodiments of the present invention is provided with a charge control device that is adapted to decrease the positive potential of a separation area at which positively charged airflow flowing along a vehicle surface deviates from the vehicle surface during propulsion by applying negative ions to an inner surface of the separation area.

Specifically, the charge control device comprises an ionizer that is adapted to generate the negative ions, and a pipe that extends from the ionizer to the vicinity of the separation area. The pipe has an air hole opening to the inner surface of the separation area.

A plurality of separation areas exist in the vehicle, and hence the pipe of the charge control device is provided with a plurality of the air holes individually opening to the inner surfaces of the separation areas.

In addition, the pipe of the charge control device includes a branched pipe having a plurality of the air holes individually opening to the inner surfaces of the separation area.

Thus, the vehicle of the present invention is provided with the charge control device adapted to decrease the positive potential of the separation area of the airflow flowing by blowing negative ions onto the inner surface of the separation area. According to embodiments of the present invention, therefore, the positive potential of the separation area is decreased from inside, and the separation area is eventually charged with the negative potential. For this reason, repulsive force acting between the positively charged airflow flowing from the outer surface of the vehicle and the outer surface of the vehicle can be reduced to attract the airflow thereto. That is, separation of the airflow from the separation area can be prevented to ensure desired aerodynamic characteristics. In addition, since the charge control device is arranged inside of the vehicle, deterioration in aerodynamic characteristics of the vehicle can be prevented without causing disfigurement of the vehicle.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 5:
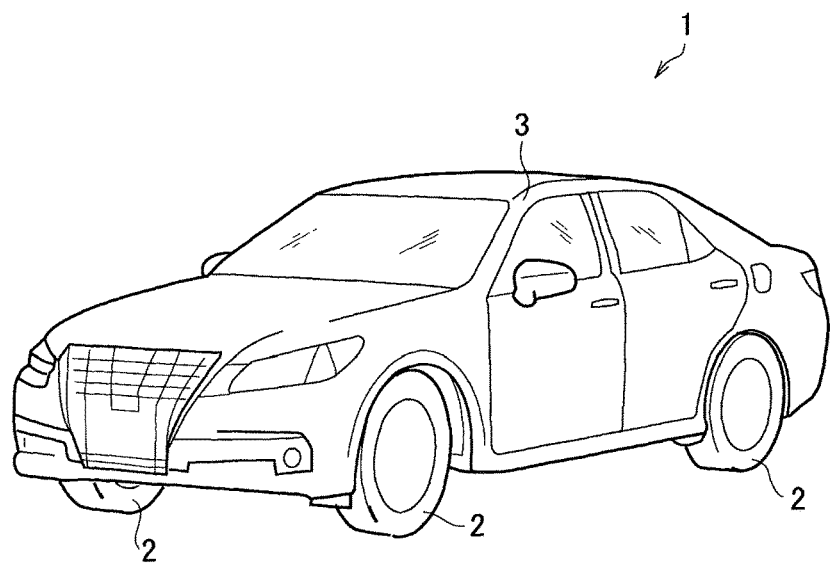
FIG. 5 is a perspective view showing one example of a vehicle to which an embodiment of the present invention is applied.

Referring now to FIG. 5, there is shown one example of a vehicle to which an embodiment of the present invention is applied. In the vehicle 1, a tire made of insulating material whose electrical conductivity is small, such as rubber, is individually mounted on each wheel 2 to insulate a vehicle body 3 from a road surface. During propulsion of the vehicle 1, positive static charges may accumulate on a body 3 for a variety of reasons, e.g., friction between a surface of the body 3 and external airstream or friction between an air duct and air flowing therethrough. The positive static charges may also accumulate on the body 3 due to friction between slidable members of a prime mover such as an engine and a motor, a transmission, a suspension etc. The positive static charges may also accumulate on the body 3 due to friction between the tire and the road surface, and an electrical spark resulting from detachment of the tire from the road surface. In addition, the positive static charges may also accumulate on the body 3 due to electrical activity of electrical equipment and an influence of external electrical cables etc.

Static electricity may also accumulate on other part of the body and panels made of material of relatively high electrical conductivity due to electrical resistance at a joint portion.

Figure 6:
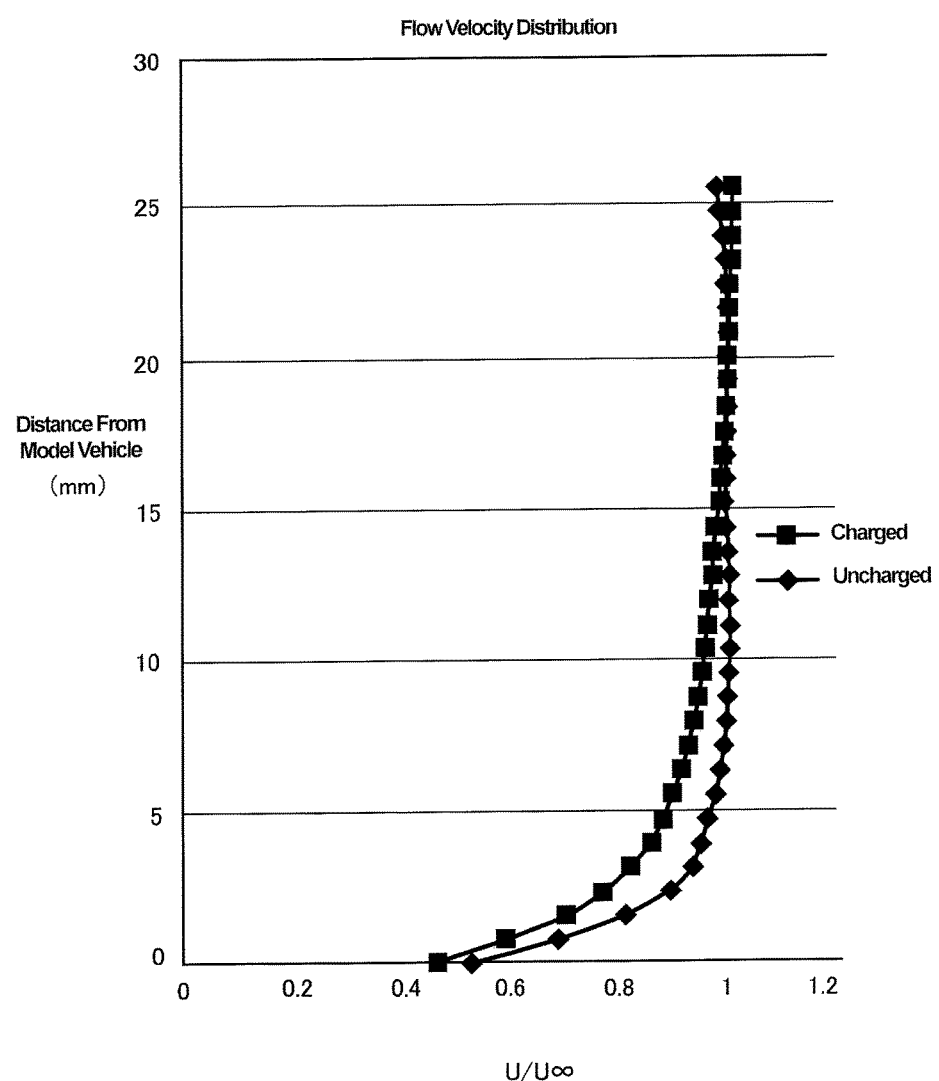
FIG. 6 is a graph indicating measurement results of flow velocity distributions in a direction perpendicular to a surface of a model vehicle.

Air is charged positively and hence repulsive force acts between the air and the body 3 on which the positive charges accumulate. Turning to FIG. 6, there are shown measurement results of flow velocity distribution in a direction perpendicular to a positively charged surface of a model vehicle, and flow velocity distribution in a direction perpendicular to an uncharged surface of a model vehicle. In FIG. 6, the vertical axis represents a distance from the surface of the model vehicle, and the horizontal axis represents a ratio of a flow velocity $U$ of the air flowing on the surface of the model vehicle to a flow velocity $U\infty$ measured from a predetermined distance ($U/U\infty$). Square dots represent measured values of flow velocity of the air flowing on the positively charged surface of the model vehicle, and rhombus dots represent measured values of flow velocity of the air flowing on the uncharged surface of the model vehicle.

As can be seen from FIG. 6, a thickness of a boundary layer (i.e., a distance from the vehicle surface at which the ratio $U/U\infty$ is substantially zero) of the case in which the surface of the model vehicle is positively charged is thicker than that of the case in which the surface of the model vehicle is not charged. This means that the airflow is isolated further away from the positively charged surface of the model vehicle in comparison with the case in which the surface is not charged. This is because the airflow is charged positively and hence the positively charged airflow and the positively charged surface of the vehicle repel each other.

During propulsion of the vehicle 1, the airflow flowing along the surface of the body 3 has a tendency to deviate from the surface of the body 3 at specific points. Specifically, the airflow deviates from the surface of the body 3 at a portion where the body 3 is bent inwardly or protruded outwardly. For example, the airflow has a tendency to deviate from the surface of the body 3 at depressions on a bonnet, a roof, and side members. In addition, the airflow also deviates from an outer surface of an undercover at corners between a downwardly slanted plate and a flat plate, and between the flat plate and an upwardly slanted plate. Those points at which the airflow deviates from the surface of the body 3 will be called the "separation area" in the following description and claims.

The airflow is attracted to the surface of the body 3 by the Coanda effect in accordance with a speed difference between the airflow and the vehicle body 3 even at the above-mentioned separation areas. However, given that the body 3 is charged positively, the positively charged airflow is repelled therefrom. In order to avoid such separation of the airflow from the vehicle body, according to the preferred example, the positive potential of the separation area is decreased or the separation area is charged negatively by blowing negative ions onto the separation area from inside of the vehicle by a charge control device.

Figure 1:
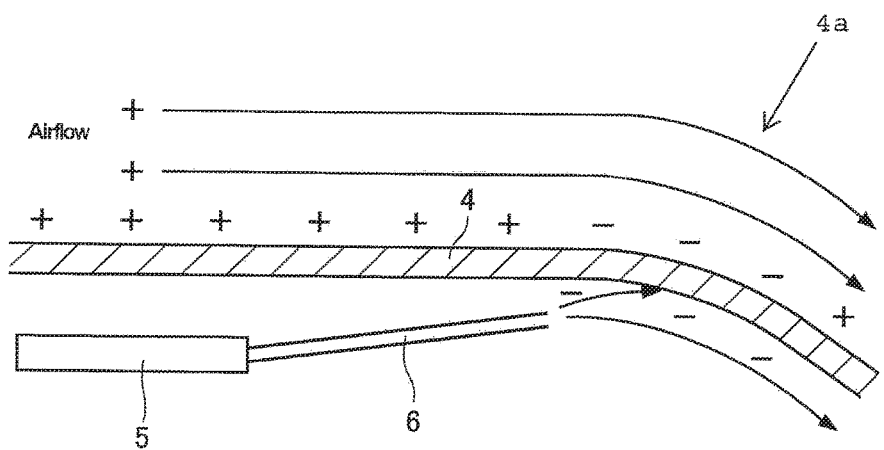
FIG. 1 is a cross-sectional view showing a cross-section of a charge control device according to the preferred example.

Turning to FIG. 1, there is shown a cross-section of the charge control device. In the vehicle 1, an upstream side of a panel 4 is formed into a flat wall but a downstream side thereof is curved inwardly to form the above-mentioned separation area 4a. According to the preferred example, the charge control device includes an ionizer 5 for generating negative ions, and a first pipe 6 extending from the ionizer 5 along a flowing direction of the airflow to the vicinity of the inner face of the separation area 4a. The negative ions generated by the ionizer 5 are delivered to the inner face of the separation area 4a through the first pipe 6.

Figure 2:
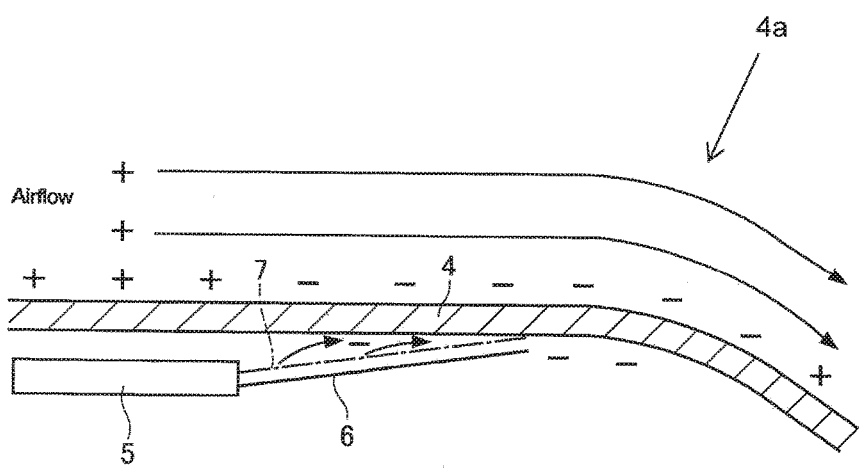
FIG. 2 is a cross-sectional view showing a cross-section of the charge control device in which a slit is formed on a pipe.

The negative ions discharged from the first pipe 1 spread on the inner surface of the panel 4 around the separation area 4a so that the positive potential of the separation area 4a is decreased, and eventually charged with the negative potential. The separation area 4a at which the separation of the airflow from the vehicle body 3 can be found by experimentation or simulation, and an area of the inner surface of the panel 4 to be charged negatively may be determined in such a manner not to cause deterioration in aerodynamic characteristics. Optionally, in order to enlarge the area to be charged negatively, a slit 7 may be formed on an upper face of the first pipe 6 as illustrated in FIG. 2. In this case, the negative ions may be applied to the inner surface of the panel 4 not only from an opening of the first pipe 6 but also from the slit 7 so that the area to be charged negatively can be elongated in the flowing direction of the airflow. To this end, a length and number of slit(s) 7 may be determined arbitrarily according to need.

According to the preferred example, therefore, the repulsive force acting between the positively charged airflow and the panel 4 can be reduced by thus charging the separation area 4a with the negative potential by reducing the positive potential so that the airflow can be attracted to the outer surface of the panel 4 by Coulomb force. For this reason, deterioration in aerodynamic characteristics of the vehicle 1 in the rolling direction and the yawing direction can be prevented. In addition, since the charge control device is arranged inside of the vehicle 1, deterioration in aerodynamic characteristics of the vehicle 1 can be prevented without causing disfigurement of the vehicle 1.

Next, here will be explained an example of preventing separation of the airflow from a windshield 8 and a roof 9 with reference to FIGS. 3 and 4. In the vehicle 1, a leading end of the roof 9 is bent downwardly to be connected to the windshield 8, and hence the airflow flowing from the windshield 8 toward the roof 9 has a tendency to deviate from an outer surface of the curved portion of the roof 9. If the separation of airflow is caused at a front side of the vehicle 1, downforce applied to front wheels is weakened thereby decreasing control stability. In order to effectively prevent such separation of the airflow, according to the example shown in FIG. 3, the charge control device is disposed on an inner surface of the roof 9 at a width center thereof to apply the negative ions to the roof 9 along the width center and to a connection between the windshield 8 and the roof 9.

Specifically, an inner panel 10 is attached to an inner surface of the roof 9 along the width center of the roof 9 while keeping a predetermined clearance therebetween, and the ionizer 5 is held in the inner panel 10 at a position in front of a longitudinal center. The ionizer 5 is connected to a second pipe 11 extending toward the windshield 8, and to a third pipe 12 extending toward the longitudinal center of the roof 9. The second pipe 11 is also connected to a fourth pipe 13 extending laterally along the connection between the upper edge of the windshield 8 and the leading end of the roof 9. As shown in FIG. 4, the fourth pipe 13 is provided with three first air holes 14 individually opening toward the inner surface of the upper edge of the windshield 8, and three second air holes 15 individually opening toward the inner surface of the leading end of the roof 9. Preferably, the first air holes 14 and the second air holes 15 are individually formed at the width center and width ends of the fourth pipe 13.

The third pipe 12 extends to the vicinity of the longitudinal center of the roof 9, and two third air holes 16 opening to the inner surface of the roof 9 are formed thereon at a predetermined distance.

Figure 3:
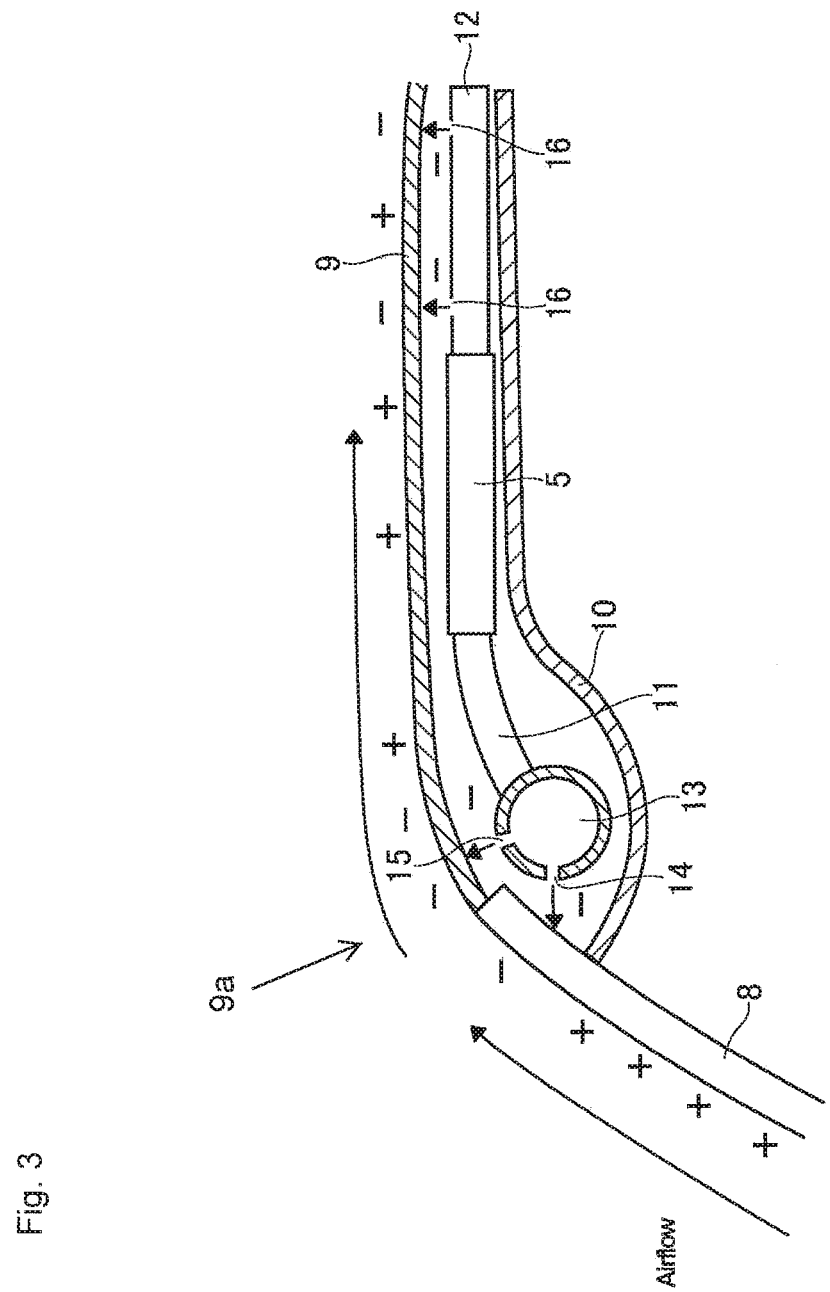
FIG. 3 is a cross-sectional view showing a cross-section of the charge control device adapted to blow negative ions onto a windshield and a roof.
Figure 4:
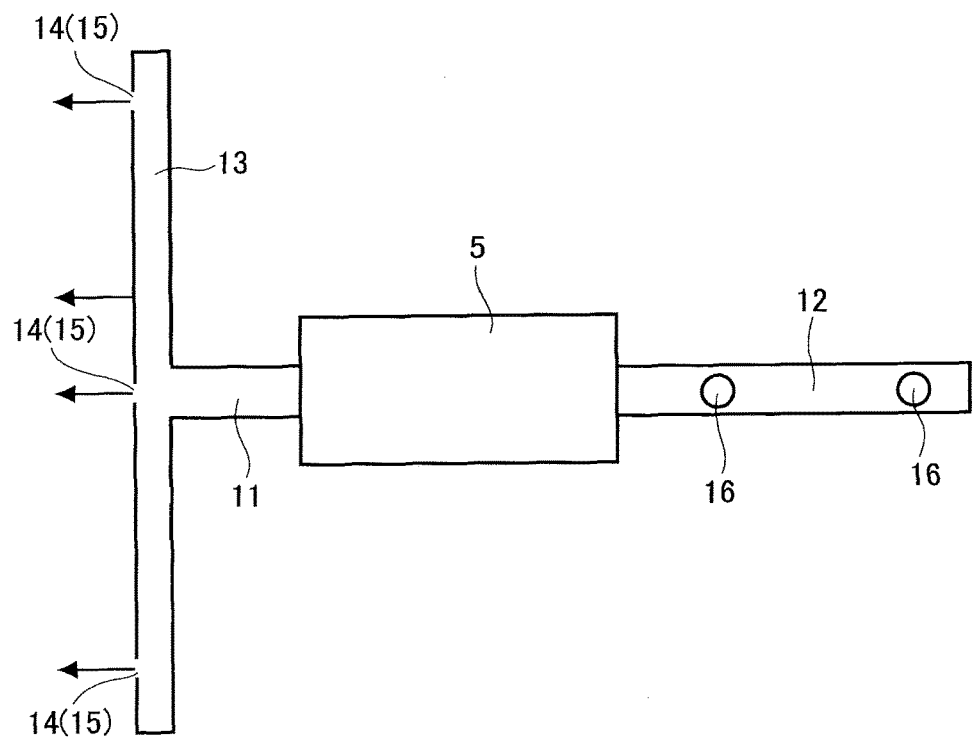
FIG. 4 is a top view of the charge control device shown in FIG. 3.

According to the example shown in FIGS. 3 and 4, therefore, the negative ions generated by the ionizer 5 are delivered to the fourth pipe 13 through the second pipe 11, and blown onto the inner surfaces of the upper edge of the windshield 8 and the leading end of the roof 9 from the first air holes 14 and the second air holes 15. In addition, the negative ions generated by the ionizer 5 are also delivered to the third pipe 12 and blown onto the center of the inner surface of the roof 9 from the third air holes 16. Consequently, the positive potentials of those separation areas 9a are decreased, and the separation areas 9a are eventually charged negatively. For this reason, the repulsive force acting between the positively charged airflow flowing from the outer surface of the windshield 8 toward the roof 9 and the outer surface of the roof 9 can be reduced to attract the airflow thereto. That is, separation of the airflow from the separation area 9a can be prevented. According to the example shown in FIGS. 3 and 4, therefore, deterioration in aerodynamic characteristics resulting from reduction in downforce can be prevented to ensure control stability.

In addition to the above-mentioned advantages, separation of the airflow from the width center of the outer surface of the roof 9 may also be prevented to allow the airflow to flow to the rear side of the roof 9. For this reason, reduction in downforce acting on rear wheels may also be prevented. That is, acceleration of a rear drive layout vehicle may be ensured by the charge control device according to the preferred example. Moreover, since the negative ions generated by the ionizer 5 are delivered to the separation areas 9a through the piping, the negative ions may also be delivered easily to other intended points by merely modifying the piping.

Further, since the separation of the airflow from the width center of the outer surface of the roof 9 is thus prevented, turning performance and travelling stability of the vehicle 1 can be ensured. Specifically, even when the vehicle 1 making a turn receives air diagonally, the difference between downforces at the inner wheel side and the outer wheel side can be reduced to improve a turning performance of the vehicle 1.

The structure of the charge control device according to the preferred examples may be modified according to need within the spirit of the present invention. For example, a plurality of ionizers may be arranged in the vehicle to negatively charge uneven points of a bonnet, a center pillar, a grip of door handle etc. In this case, given that the vehicle is a rear drive layout vehicle, the negative ions may be selectively blown onto inner surfaces of the separation areas depending on the situation. For example, when the vehicle is accelerated, the negative ions blown onto the inner surface of the separation area that can ensure downforce applied to the rear wheels may be increased by increasing voltage of the ionizer involved. By contrast, when the vehicle makes a turn, the negative ions blown onto the inner surface of the separation area that can ensure downforce applied to the front wheels may be increased by increasing voltage of the ionizer involved.

What is claimed is:

1. A vehicle, in which positive static charges accumulate on a vehicle body insulated from a road surface during propulsion,
wherein the positively charged vehicle body includes a separation area at which the vehicle body is bent inwardly or protruded outwardly, and positively charged airflow flows along the positively charged surface of the vehicle body during the propulsion,
the vehicle comprising:
a charge control device configured to decrease positive potential of the separation area by blowing negative ions onto an inner surface of the separation area.

2. The vehicle as claimed in claim 1, wherein the charge control device includes:
an ionizer that is adapted generate the negative ions; and
a pipe that extends from the ionizer to a vicinity of the separation area and that has an air hole opening to the inner surface of the separation area.

3. The vehicle as claimed in claim 2,
wherein the separation area includes a plurality of areas, and
wherein the pipe comprises a plurality of air holes individually opening to the inner surfaces of the separation areas.

4. The vehicle as claimed in claim 2, wherein the pipe includes a branched pipe having a plurality of air holes individually opening to the inner surfaces of the separation area.

5. The vehicle as claimed in claim 2, wherein the pipe extends from the ionizer along a flowing direction of the airflow.

6. The vehicle as claimed in claim 2, wherein the pipe extends to the vicinity of the inner face of the separation area.

7. The vehicle as claimed in claim 2, wherein a slit is formed on the pipe.

8. The vehicle as claimed in claim 2, wherein a plurality of slits are formed on an upper face of the pipe in a flowing direction of the airflow.

* * * * *